Figure 1:
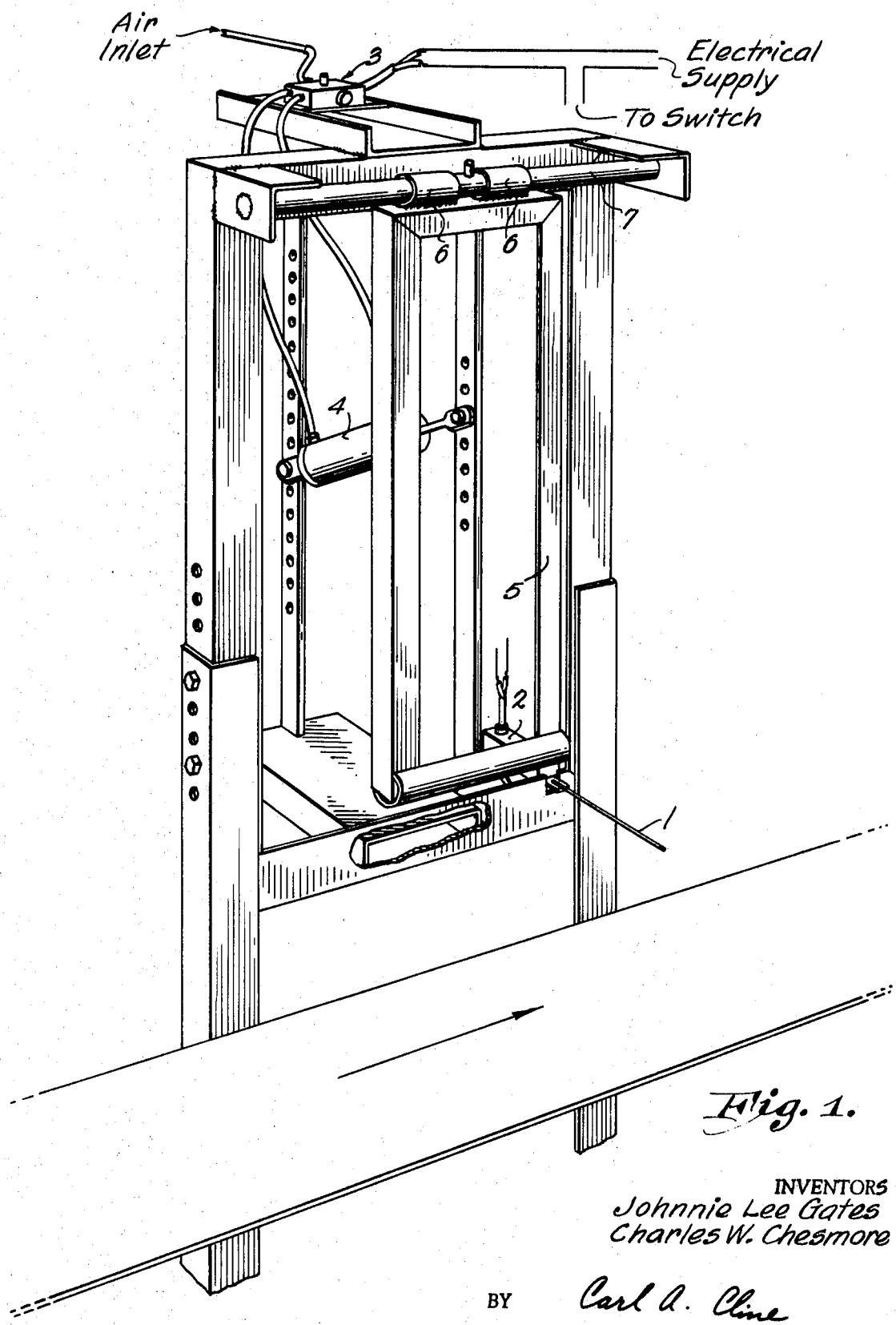

United States Patent

[11] 3,568,814

| [72] | Inventors | Johnnie L. Gates |
| --- | --- | --- |
| | | Prairieville, La.; |
| | | Charles W. Chesmore, Sikeston, Mo. |
| [21] | Appl. No. | 789,450 |
| [22] | Filed | Jan. 7, 1969 |
| [45] | Patented | Mar. 9, 1971 |
| [73] | Assignee | Gulf Oil Corporation |
| | | Pittsburgh, Pa. |

[54] AUTOMATIC CONVEYOR DISCHARGE SYSTEM
1 Claim, 2 Drawing Figs.

[52] U.S. Cl. .................................................. 198/21, 198/24
[51] Int. Cl. .................................................. B65g 47/42, B65g 47/52
[50] Field of Search ....................................... 198/21, 24; 200/61.41, 61.42, 61.49

[56] References Cited
UNITED STATES PATENTS

| 1,580,782 | 4/1926 | Gross | 200/61.41X |
| 2,525,953 | 10/1950 | Saxe | 198/21 |
| 2,541,376 | 2/1951 | Nelson | 200/61.41X |

*Primary Examiner*—Robert G. Sheridan
*Attorneys*—Richard L. Kelly, Carl A. Cline, Forrest D. Stine and Richard A. Anderson ABSTRACT: Distribution of filled bags of solids after bag sealing is obtained without interruption of flow by discharging bags from a constantly moving conveyor by means of an air-cylinder-powered discharging member which swings transversely across the conveyor in response to actuation of a flexible microswitch actuating arm by the moving bag, thereby transferring the bag to a second constantly moving conveyor. An electrical counting and control system may be used so as to discharge the desired number of bags at any one of several such discharging stations.

AUTOMATIC CONVEYOR DISCHARGE SYSTEM

DESCRIPTION OF THE INVENTION

The efficiency of a bagging operation where solids are packed in bags and the bags are then stitched or sealed depends to a great extent on freedom from interruption of flow of filled bags. Most bag-sealing and sewing devices require constant movement of bags during this operation. If bags are not carried away from the sealing station promptly and distributed it may be necessary to reduce the speed of the sealing operation, or halt the process until the distribution system catches up. It is desirable to employ constantly moving conveyors throughout the bag-sealing and distribution system and to have ample provisions for unexpected occurrences, as, for example, bags which are observed to have defective seals or are damaged, or underweight, or are packed to different weights or contain different products, requiring discharge at different places. It is usually necessary to provide for a discharge station for rejects, as well as for distribution of specified numbers of bags to a multiplicity of locations.

In an operation such as the bagging of granular fertilizer there is usually sufficient dust in the air to interfere with the functioning of optical systems, so that photoelectric control devices are not reliable. We have found that a much more reliable and satisfactory control device is a microswitch with a flexible wire-actuating arm which is responsive to movement of a bag on the conveyor, yet is easily swept aside and does not interfere with that movement. In this way the presence of a bag in discharging position is reliably sensed and a suitable discharge device may be actuated.

With regard to the actual discharge, we have found it to be most desirable to push the bag off the conveyor by applying force at about the middle of the bag. In this way the weight of the bag is taken off the conveyor when the bag changes direction of movement.

Figure 2:
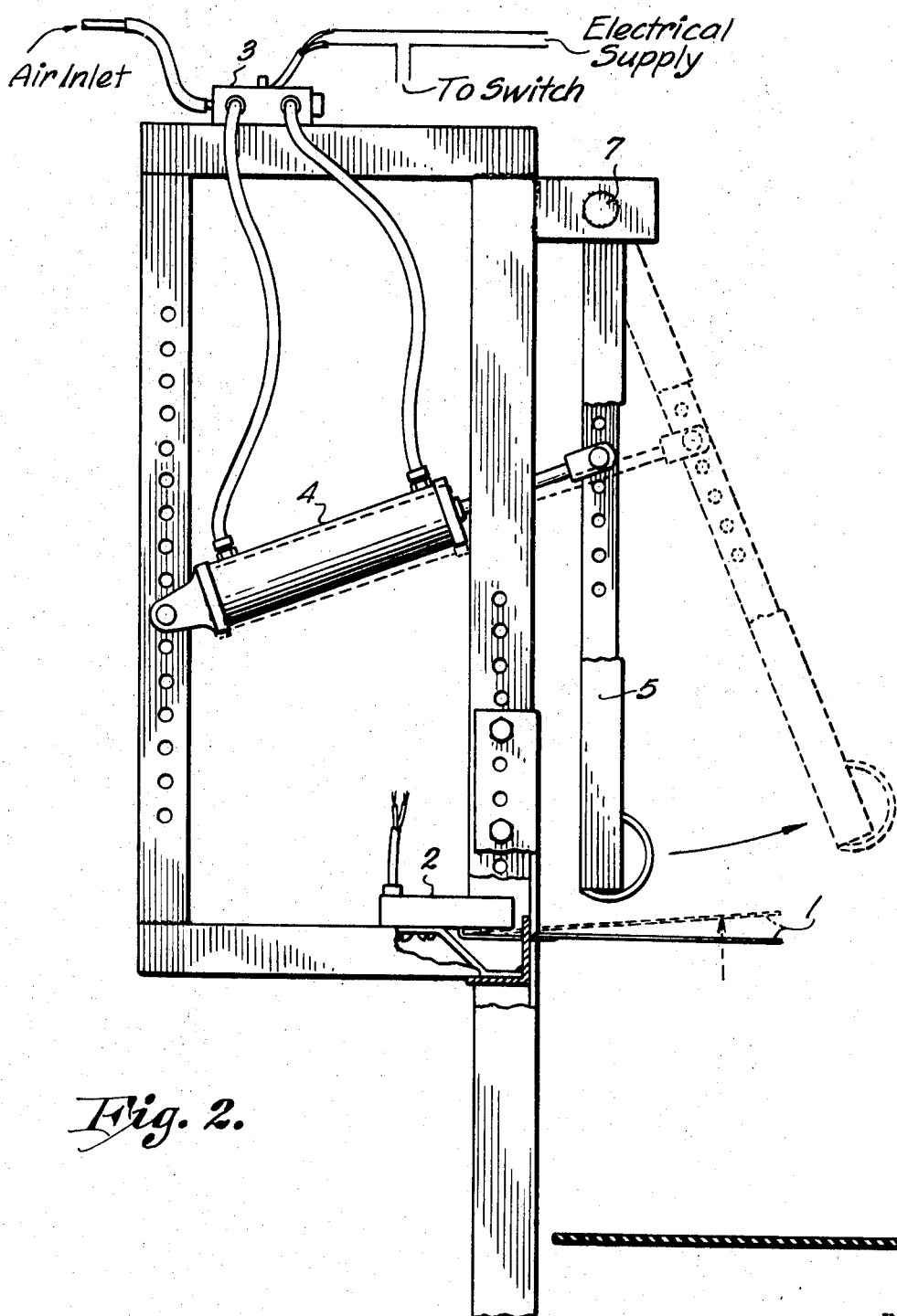

The conveyor discharge system may be better understood by reference to FIG. 1 and sideview, FIG. 2.

In a typical operating cycle a filled bag resting on the belt conveyor touches the flexible switch-actuating arm 1, closing the switch 2 and actuating electric air valve 3. The air cylinder 4, then operates, swinging the bag pusher 5 which pushes the bag off the constantly moving conveyor and on to the adjacent conveyor which carries the bag away. With the bag out of the way, the actuating arm 1 returns to rest and the switch 2 returns to normally open position. The bag pusher then swings back on hinges 6, which fit loosely on shaft 7.

Preferably, the bottom of the bag pusher has a curved surface free from sharp projections, as shown in the drawings. The face of the bag pusher may be covered with a smooth plate but this is not necessary, as the two flat side members shown in the drawings provide sufficient support for the bag.

A plurality of conveyor discharge stations may be used to distribute bags to different locations or to sort bags of different products. By inactivating the switch 2, discharge of a bag is avoided. The flexible switch actuating arm is swept out of the way as the bag goes by and the bag will go on to be discharged at another station.

The bag discharge system operates without interrupting or interfering with the continuous running of belt conveyors. The system is virtually unaffected by dust and operates reliably with minimum maintenance.

We claim:

1. The combination with a constantly moving conveyor for filled bags of solids of:
   a. a sensing device consisting of a flexible actuating arm attached to an electrical switch, said flexible actuating arm being positioned in the path of said filled bags so that as the bag passes along the conveyor the flexible arm is swept aside without substantially interfering with the movement of the filled bag or the conveyor;
   b. a conveyor discharge device consisting of a downwardly disposed pivoted member positioned adjacent to the constantly moving conveyor so as to swing transversely across the constantly moving conveyor, said pivoted member having attached thereto an actuating device consisting of an air-powered piston and cylinder and air supply control means responsive to the electrical switch sensing device, so that actuation of the electrical switch by a filled bag on the conveyor results in swinging of the pivoted member transversely across the constantly moving conveyor, discharging the bag therefrom; and
   c. a second constantly moving conveyor positioned horizontally and with a direction of travel at substantially 90° to and away from the direction of travel of the first conveyor and directly across from the discharge device so that discharged bags are received by the second conveyor.